United States Patent [19]

Sambrook

[11] 3,925,882

[45] Dec. 16, 1975

[54] COMPOSITE MATERIALS

[75] Inventor: David John Sambrook, Warley, England

[73] Assignee: Imperial Metal Industries (Kynoch) Limited, Birmingham, England

[22] Filed: Apr. 16, 1974

[21] Appl. No.: 461,353

Related U.S. Application Data

[62] Division of Ser. No. 242,969, April 11, 1972, abandoned.

[30] Foreign Application Priority Data

Apr. 15, 1971 United Kingdom ................. 9495/71

[52] U.S. Cl. .................... 29/599; 29/191.6; 29/199; 29/198; 74/126; 29/DIG. 11; 29/DIG. 47

[51] Int. Cl.$^2$ .......................................... H01V 11/00

[58] Field of Search .......... 29/191.6, 199, 599, 624, 29/DIG. 11, DIG. 47; 174/126 CP, DIG. 6

[56] References Cited

UNITED STATES PATENTS

| | | | |
|---|---|---|---|
| 1,292,659 | 1/1919 | Speed | 29/199 X |
| 2,120,561 | 6/1938 | Laise et al. | 29/199 X |
| 3,370,347 | 2/1968 | Garwin et al. | 29/599 |
| 3,447,913 | 6/1969 | Yntema | 29/191.2 |
| 3,465,430 | 9/1969 | Barber et al. | 29/599 |
| 3,505,039 | 4/1970 | Roberts et al. | 29/191.6 |
| 3,509,622 | 5/1970 | Bernert et al. | 29/599 |
| 3,513,537 | 5/1970 | Williams | 29/599 |
| 3,623,221 | 11/1971 | Morton et al. | 29/599 |
| 3,800,061 | 3/1974 | Larson et al. | 174/126 CP |

FOREIGN PATENTS OR APPLICATIONS

| | | | |
|---|---|---|---|
| 1,205,130 | 9/1970 | United Kingdom | 29/599 |

*Primary Examiner*—C. W. Lanham
*Assistant Examiner*—V. K. Rising
*Attorney, Agent, or Firm*—Cushman, Darby & Cushman

[57] ABSTRACT

A composite material superconductor having a plurality of filaments of superconductor surrounded by a good normal conductor, the normal conductor being broken up by higher resistance material longitudinally across the width of the conductor to reduce eddy currents in the conductor when in use.

6 Claims, 9 Drawing Figures

COMPOSITE MATERIALS

This is a division of application Ser. No. 242,969, filed Apr. 11, 1972, now abandoned.

BACKGROUND OF THE INVENTION

This invention relates to composite materials and methods of manufacture thereof.

SUMMARY OF THE INVENTION

By the present invention there is provided a composite material comprising a plurality of longitudinally extending filaments of a first non-ferromagnetic material having an electrical resistivity at 0°C of less than 3 micro-ohms per cm, each filament being separated from the other filaments by a layer of a second metal of a higher electrical resistivity, the filaments being metallurgically bonded to their adjacent layers of metal, and the adjacent layers of metal of adjacent filaments being metallurgically bonded to one another.

The composite may be in the form of a tube, the walls of the tube may be formed from the longitudinally extending filaments and the layers of second metal. The walls may be formed of alternate segments of the first and second materials. Alternatively the walls may be formed from a plurality of filaments of the first metal in a matrix of the second metal.

The inside and/or the outside of the walls may be covered with a metal of higher electrical resistivity, preferably the second metal, the metal being metallurgically bonded to the tube walls.

The metal having a higher electrical resistivity may be a non-ferromagnetic metal.

Preferably less than 50% by weight of the composite is constituted by the metal of higher electrical resistivity; preferably further this percentage is less than 10%.

Preferably also the resistivity of the material having the higher resistivity is at least 10 times, preferably at least 40 times, that of the metal of low resistivity. These proportions are taken at ambient temperatures, such that if the composite material is used at very low temperatures, for example when cooled by liquid nitrogen or liquid helium, there may be a greater proportionality between the resistivities of the materials. In such a cooled environment, preferably the resistivity of the metal having the higher resistivity is at least 2000 times that of the metal of low resistivity.

The composite may be twisted along a longitudinal axis whereby, except for any central filament, each filament follows a helical path.

Preferably further the metal of low electrical resistivity is copper and the material of higher resistivity is an alloy of copper with 2–30wt.% nickel or a titanium alloy or an alloy of nickel with 10–30wt.% chromium, preferably nickel 20wt.% chromium.

The invention also consists in a method of manufacturing a metal composite material comprising assembling together a plurality of longitudinally-extending elements of a non-ferromagnetic metal having a low electrical resistivity, separating each element from the other elements by a layer of a metal having a higher electrical resistivity than that of the metal of the elements, seccuring the assembly together, and longitudinally extending the assembly to elongate the elements to produce corresponding filaments and to bond the components of the assembly securely together.

Preferably the higher resistive material is a metal and the components of the assembly are secured together by metallurgically bonding the elements of low electrical resistivity with the metallic material having a higher electrical resistivity.

The assembly may be produced by taking an element of the low resistivity metal, surrounding it with a layer of the higher resistive metal to form a sub-assembly, longitudinally extending the sub-assembly to secure the components thereof together, cutting the extended subassembly into a number of lengths, and stacking those lengths together to form said assembly. Alternatively, said assembly may be formed by stacking a number of tubes of metal of higher resistivity, and providing within each tube an element of the metal of low resistivity. In the latter case, preferably the tubes are of hexagonal shape and each element is of a complementary cross-section to fit within the corresponding tube.

Preferably also the longitudinal elongation is initially carried out by extrusion. Preferably further said extrusion is carried out at an elevated temperature, typically between 250° and 1000°C.

BRIEF DESCRIPTION OF THE DRAWINGS

By way of example, embodiments of the present invention will now be described with reference to the accompanying drawings of which.

DESCRIPTION OF THE PREFERRED EMBODIMENTS

Figures 1, 2:
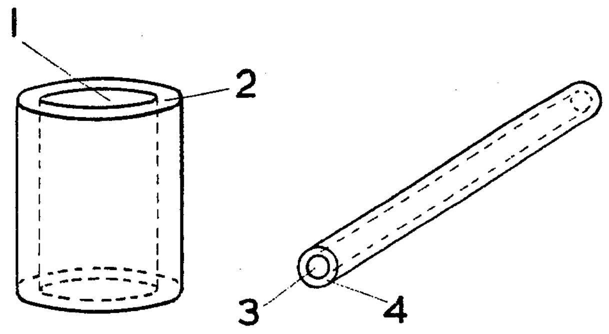
FIG. 1 is a perspective view of an assembly.
FIG. 2 is a perspective view of an elongated assembly.

In one embodiment of rod 1 of high purity, high-conductivity copper is assembled within a tube 2 of the alloy copper 30wt.% nickel, the assembly is evacuated and sealed and it is then extruded at a temperature of 550°C to produce a copper bar clad with a metallurgically bonded sheath of cupro-nickel. The bar is drawn at ambient temperatures to produce a rod which is finally deformed to be of hexagonal cross-section 5. The rod is then cut into a number of lengths which are stacked together within an extrusion can 6 of the same cupro-nickel alloy, extra spaces being taken up by thin wires of copper clad in cupro-nickel 6*a*, and this is extruded at a temperature of 950°C and drawn at ambient temperatures. The resulting product is a composite material in which a plurality of filaments of copper are separated from each other by layers of the cupro-nickel alloy. The alloy copper 30wt.% nickel has an electrical resistivity approximately 23 times that of high purity copper at room temperatures. When the composite material of this embodiment is cooled to 4.2°K, the copper-nickel alloy has an electrical resistivity approximately 4750 times that of high purity copper.

Figure 5:
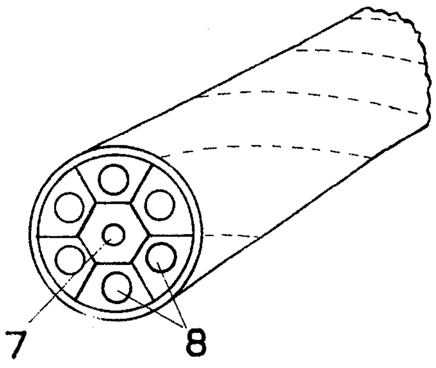
FIG. 5 is a perspective view of a twisted assembly.
Figure 6:
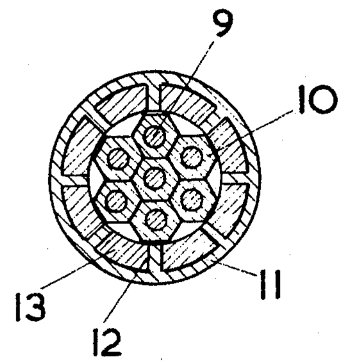
FIG. 6 is a cross-section of a further assembly.

The composite can then be twisted along its longitudinal axis, FIG. 5, so that, except for any central filament 7, each copper filament 8 follows a helical path along the composite. The twisted composite can be used to carry power or electrical signals, and will have reduced A.C. losses and collect less noise from background electrical sources. It thus finds application in power transmission for example in electrical cables, particularly in cryo-cooled installations, ie where the electrical cable has been cooled to the temperature of liquid nitrogen or even that of liquid helium. The latter temperature is about 4.2°K. The composite can be of any desired profile, and for example when rectangular can be used for packing the rectangular spaces in the rotor or stator of an electrical generator or motor, as will be appreciated by the man skilled in the art.

Figure 3:
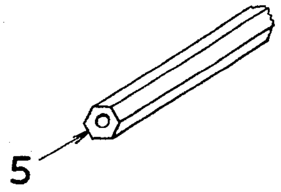
FIG. 3 is a perspective view of a part of a formed assembly.
Figure 4:
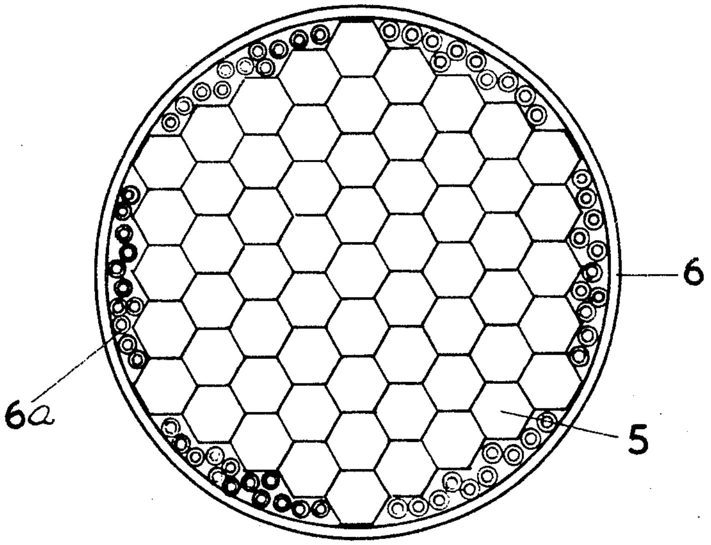
FIG. 4 is a cross-section of a further assembly.

In an alternative form of the invention, copper filaments 9 covered with a titanium alloy 10, such as commercial purity titanium, or an alloy of titanium designated IMI 318 which is a Ti-6wt.% Al-4wt.% V alloy, are formed as described above with reference to FIGS. 1 to 3. These filaments are then assembled in a can which has been prepared as follows.

A thick walled copper can is machined from a billet of copper and longitudinal slots are machined into the outer wall of the can, in this case eight slots are formed, and they are spaced equally about the tube axis. Titanium 318 strips are rolled to the correct thickness and edge milled in preparation for insertion into the slots. The strips are then pickled and degreased and inserted into the slots which have also been cleaned. A titanium can of the same composition as the strips is then prepared, pickled, degreased and slid over the copper can to form an outer sheath. The ends of the sheath are then sealed with discs electron welded in position under vacuum so that the interior of the can is under vacuum. The can is then preheated to a temperature in the range 450° to 580°C and extruded to give a tube shell. This shell is then machined to remove the blanking discs and to remove the copper from the bore of the tube. The final can thus has an outer sheath 11 of titanium with inwardly projecting segments 12 also of titanium separating segments 13 of copper.

The assembly of the filaments in the can is then longitudinally extended by hot extrusion at a temperature of 500°C ± 75°C to compact the assembly and metallurgically bond it together.

Figures 7, 8:
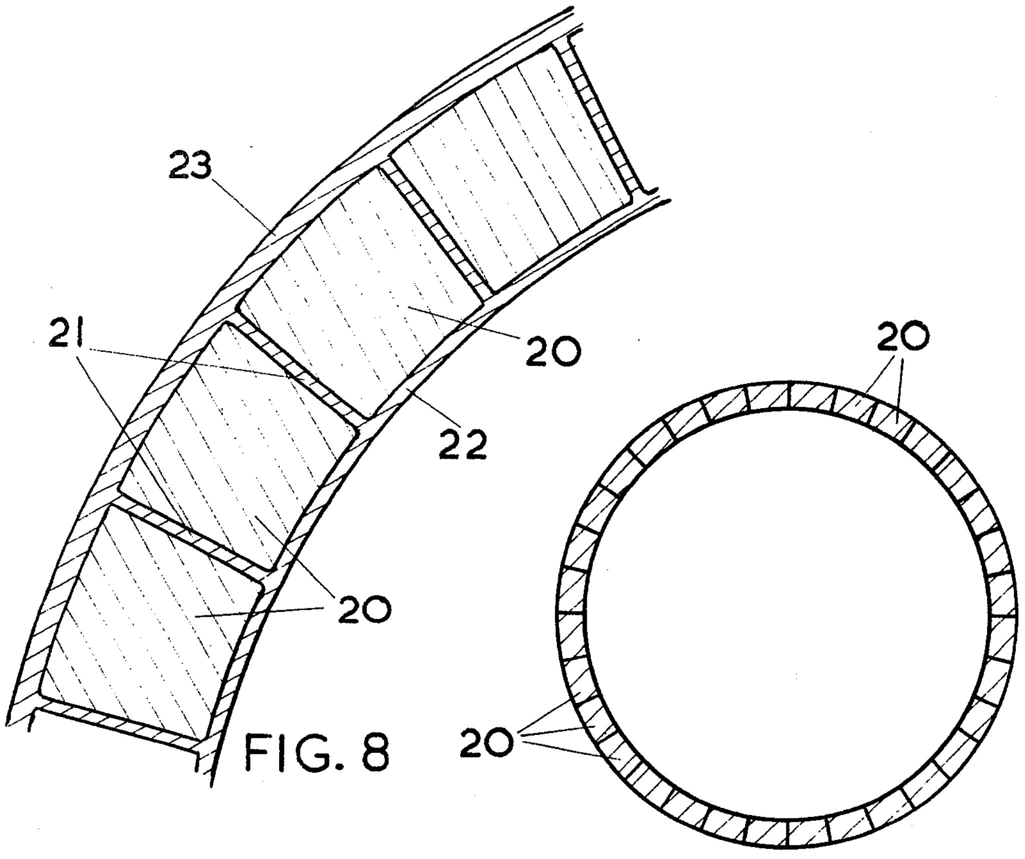
FIG. 7 is a cross-section of a hollow conductor.
FIG. 8 is an enlarged view of a part of FIG. 7.

Referring to FIGS. 7 and 8, a hollow conductor, which would normally be used when it was desired to cool the coil windings, for example in electro-magnets, electric motors or electricity generators, is illustrated, which is manufactured as described below.

A copper cylinder is machined with radial slots in the outer wall, into which cupro-nickel strips are inserted. The assembly is then placed inside a cupro-nickel tube, evacuated, sealed top and bottom with a pair of copper end plates (one of which includes a nose plug), and the assembly heated to 450°–570°C and extruded over a mandrel. The assembly is then cut into lengths of approximately 2 feet, and the centre of the lengths is machined out to reveal the cupro-nickel strips. An inner cupro-nickel tube liner is then inserted and the assembly is again evacuated, sealed, heated to 450°–570°C, and re-extruded.

The end seals are then removed and the assembly is drawn to a tube of required dimensions using a fixed or floating plugs. In the drawings, the segments 20, of copper, are the remains of the copper cylinder used initially. The barriers 21 are formed from the cupro-nickel strips inserted into the slots in the cylinder, and the inner and outer shells 22 and 23 are formed from the inner and outer cupro-nickel tubes used initially.

In a modification of the embodiments, the high purity copper filaments can be replaced by aluminum. This is of particular utility when the conductor is to be used at very low temperatures, because the drop in resistivity of high purity aluminum from room temperature to about 4.2°K is greater than the drop in resistivity of high purity copper from room temperature to about 4.2°K.

Figure 9:
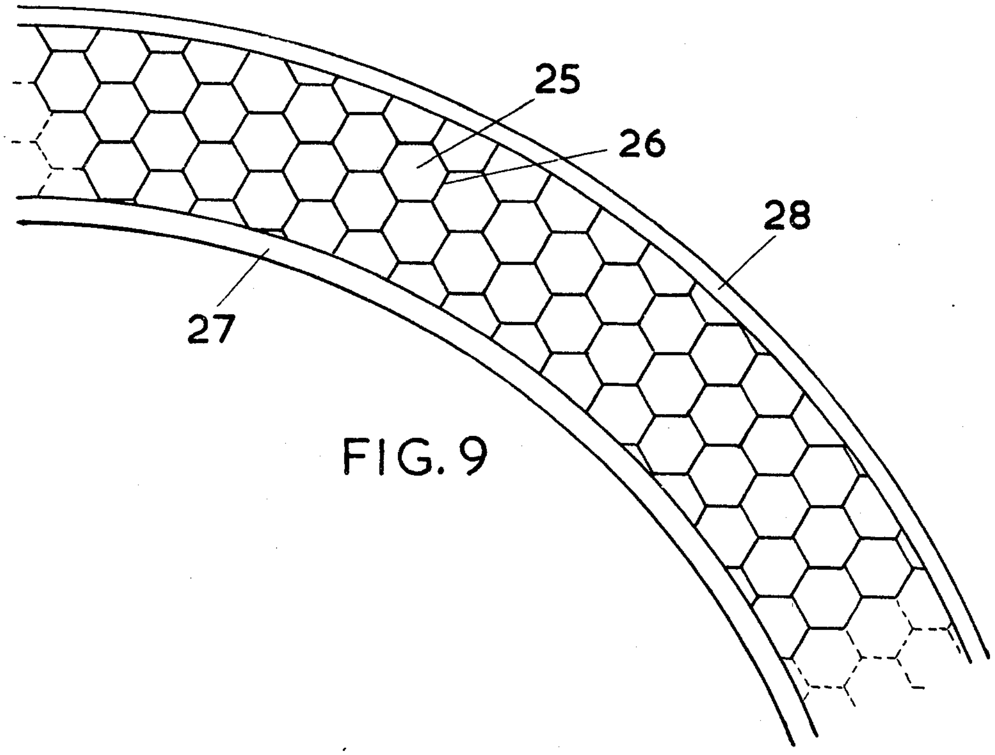
FIG. 9 is a cross-section of a further alternative conductor.

Additionally, aluminum conductors may be used with copper alloy 'insulators' at liquid nitrogen temperatures, and an example of a tubular conductor utilising aluminum strands in a copper 1% tin alloy is illustrated in FIG. 9. The assembly is manufactured as follows. An aluminum bar is inserted into a copper/1% tin alloy tube, end plates of copper are then electron beam welded on to the tube so that the interior is sealed under vacuum. The assembly is then heated to 350°–450°C, and is extruded to form a metallurgical bond between the copper/tin outer tube and the aluminum. The extruded rod is then drawn down to rod, and is given a final pass through a hexagonal die to give the rod a hexagonal cross-section. The rod is then cut into short lengths and is stacked inside two concentric copper/tin tubes as shown in FIG. 9. The inner aluminum wire 25, surrounded by a copper/tin matrix formed by adjacent copper/tin walls 26, is therefore located between inner and outer copper/tin tubes 27 and 28. The assembly is again evacuated, sealed, heated to 350°–450°C and extruded to give a tube. This tube is then drawn, using a fixed or floating plugs to give a hollow tube. If required, the tube can be given a rectangular or square external cross-section in its final passes through a series of dies. The advantage of using an aluminum conductor in a conductor is that it has a very low resistance at temperatures around the boiling point of liquid nitrogen. This means that it can be advantageously used at temperatures which can be maintained relatively easily by conventional liquid air apparatus. It is, of course, far easier to maintain a temperature of 77°K than a temperature of 4.2°K, and it is feasible to use liquid nitrogen as a coolant on a large commercial scale.

In a further modification of the typical embodiments, the copper 30wt.% nickel alloy or titanium alloy can be replaced by the alloy copper up to 50wt.% nickel, nickel 10–30 wt.% chromium, copper 5–7wt.% tin 0.01–0.02wt.% phosphorus, copper 1wt.% manganese 3wt.% silicon, copper 10wt.% manganese 2wt.% aluminum, copper 2wt.% nickel 12wt.% manganese, copper 45wt.% nickel 2wt.% manganese 22wt.% zinc, copper 27.7wt.% zinc 1.02wt.% tin 0.02wt.% iron.

I claim:

1. A method of manufacturing a metal composite material which comprises the steps of a. assembling together a plurality of longitudinally-extending elements of a non-ferromagnetic metal having a low electrical resistivity, b. separating each element from the other elements by a layer of a metal having a higher electrical resistivity, c. forming a can including a plurality of substantially alternate segments of a low electrical resistivity metal and a metal of higher electrical resistivity, d. locating the assembled elements in the can to form an assembly, e. securing the assembly together, and f. longitudinally extending the assembly to elongate the elements to produce corresponding filaments and to metallurgically bond the components of the assembly securely together.

2. A method as claimed in claim 1 in which the assembly is sealed and evacuated prior to extension.

3. A method as claimed in claim 1 in which elements of low resistivity metal are surrounded with a layer of the higher resistivity metal to form a sub-assembly, the sub-assembly is longitudinally extended to secure the components thereof together, the extended sub-assembly is cut into a number of lengths, and the lengths are stacked together for insertion into the can.

4. A method as claimed in claim 3 in which the cut lengths have a hexagonal exterior cross-section.

5. A method as claimed in claim 1 in which the composite material is in the form of a hollow tube.

6. A method as claimed in claim 5 in which the tube has a layer of a metal of higher electrical resistivity metallurgically bonded to the inside and/or the outside of the tube.

* * * * *